June 30, 1953     W. M. VENNER ET AL     2,643,921

TRUNK PISTON

Filed Dec. 12, 1947

INVENTORS:
WILLIAM M. VENNER
PERCY L. BOWSER, JR.

BY *Brunniga & Sutherland*

ATTORNEYS.

Patented June 30, 1953

2,643,921

UNITED STATES PATENT OFFICE 2,643,921

TRUNK PISTON

William M. Venner, Clayton, and Percy L. Bowser, Jr., University City, Mo.

Application December 12, 1947, Serial No. 791,186

3 Claims. (Cl. 309—13)

This invention pertains to trunk pistons of the type adapted for use in internal-combustion engines and more particularly to those made of light metal such as aluminum, magnesium, and the like.

One of the objects of this invention is to provide a piston of this type capable of providing a rigid cross-head to support the side thrust of the connecting rod, and yet be accurately controlled in its thermal expansion to maintain a substantially constant clearance in the cylinder.

Further objects will appear from the following description, in connection with the accompanying drawing, in which an illustrative embodiment of this invention will be set forth. It is to be understood, however, that the invention is susceptible of various embodiments, within the scope of the appended claims, without departing from the principles or spirit of the invention.

Generally stated, this invention contemplates a trunk piston of light metal having one or both thrust-faces separated from the head to render them flexible and to keep them cooler, and a control member of a low rate of expansion adapted to forcibly limit the expansion of the thrust-faces, said thrust-faces being otherwise rigidly supported so as to render the piston mechanically stiff.

Figure 1:
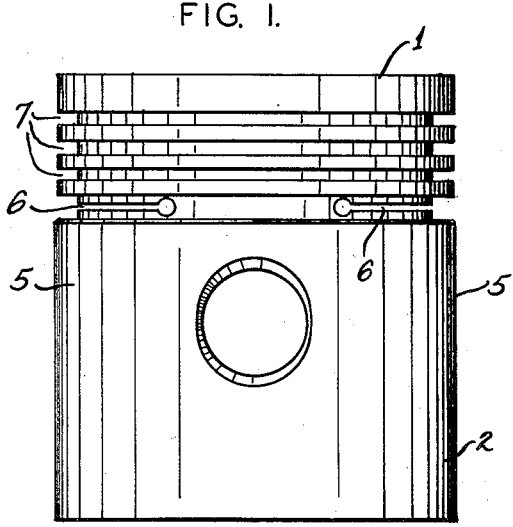
Figure 1 is a side view of a piston embodying this invention.
Figure 2:
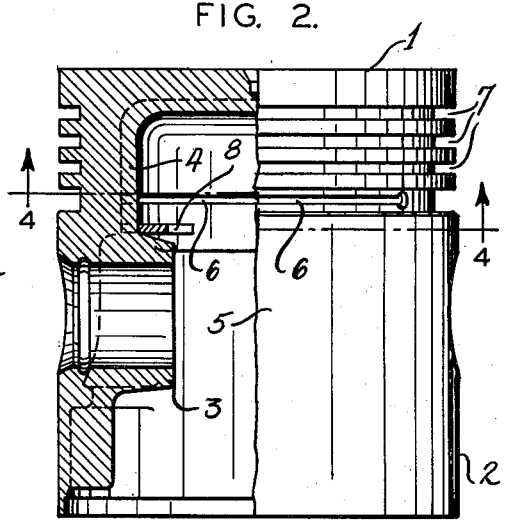
Figure 2 is a view from the right-hand side of Figure 1, partly in section along the wrist-pin axis.
Figure 3:
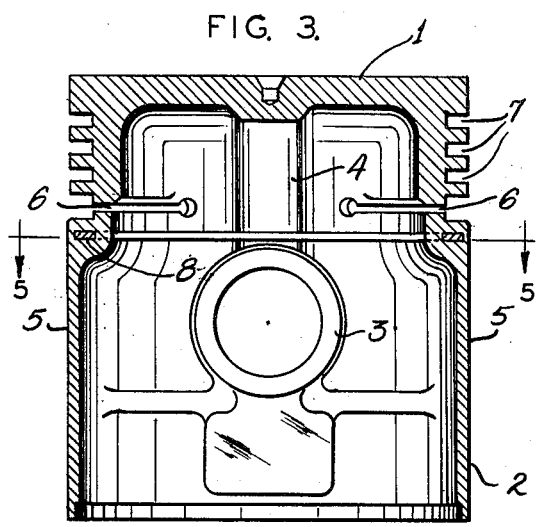
Figure 3 is a central longitudinal section taken at right angles to the wrist-pin axis.
Figure 4:
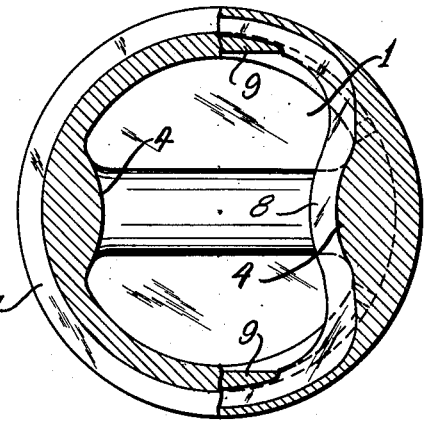
Figure 4 is a transverse section on line 4—4 of Figure 2.
Figure 5:
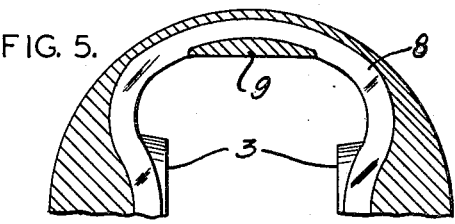
Figure 5 is a half-section on line 5—5 of Figure 3.

Referring to the drawing, the piston comprises a head 1, a skirt indicated generally at 2, and wrist-pin bosses 3 joined to the head 1 by thrust members 4 in the form of ribs laterally enlarged above the bosses as shown in Figure 4.

One or both of the thrust-face portions 5 of the skirt, between the pin bosses, may be separated from the head 1 by horizontal slots 6. This renders the upper portions of these thrust-faces more flexible radially, and also serves to keep them cooler, since the flow of heat thereto from the head 1 is interrupted by the slot 6.

Since the rate of thermal expansion of the piston metal is greater than that of the cylinder, ample clearance must be allowed where such expansion is uncontrolled. Accordingly the head 1, which may be provided with the usual piston-ring grooves 7, is reduced in diameter about .020 inch under the cylinder diameter for a piston of about 3½ inches normal diameter. Furthermore, the skirt 2 may be "cam ground," i. e. formed to have a diameter along the wrist-pin axis about .010 inch less than along the thrust axis, making the skirt oval in cross section, free of anchorage with the piston in the regions of the bosses. A clearance of about .002 inch in the thrust axis is usually allowed. The skirt may also be formed with a slight taper, being larger at the bottom or open end, which usually runs cooler.

In order to control the expansion along the thrust diameter, an open frame control member 8 is provided. This member is formed of a material having a coefficient of thermal expansion the same, or nearly the same, as that of the cylinder, such as steel. A practical method is to punch this member out of sheet steel. As may be seen from Figure 4, the member 8 is generally oval in form, with the long dimension of the oval directed along the thrust axis, the opening therein being such as to clear the end of the connecting rod. While its thickness axially of the piston is small, its radial width is relatively great, so as to render the oval stiff against tension lengthwise thereof.

The member 8 may be mounted in the mold when the piston is cast, suitable arrangements being provided to locate it as shown in the drawing, above the pin bosses and below the slot 6. Its end portions are anchored to the thrust-faces but only at their middle portions, by casting the metal therearound as indicated at 9. This places the member 8 in such relation to the thrust-faces as to resist thermal expansion of the latter, since its rate of expansion is less than that of the piston metal. It will be noted that the member 8 has an inward bend where it passes the thrust members 4 (see Figure 4), so as to pass inside of those members and so as to be free of anchorage with the piston in the regions of the bosses. This renders it free of any influence by the outward movement of the members 4 under expansion.

In the operation of this piston, thermal expansion will tend to make it "grow" in all directions. Such growth across the thrust-face diameter is limited, however, by the control member 8 which acts to control the outward as well as inward movement of the thrust-faces. As these faces are flexible, they will yield while controlled diametrically by the member 8. Where only one slot 6 is used, the entire flexure is imposed on that face. Where both slots are used, the flexure is divided between the two faces. This is accomplished by the fact that the control member, while anchored to the upper portions of the thrust faces, is so anchored to the middle portion only of the flexible thrust face or faces. Thus the expansion across the thrust-faces may be regulated to maintain substantially a constant clearance in the cylinder.

Since the thrust-face portions of the skirt are rigidly supported on the piston body at the ends of the slots 6, any flexure other than that imposed by the control member 8 is strongly resisted, and a stiff piston is provided substantially unyielding under the side thrust of the connecting rod while, at the same time, its fit in the cylinder is accurately controlled.

The open oval form of the control member makes it simple to mount in the piston mold without complicating the mold core structure.

Having thus described the invention, what is claimed is:

1. A piston of a light metal of a relatively high coefficient of thermal expansion, comprising, a head, a skirt depending from said head and provided with thrust faces one of which is separated from said head by a circumferential slot, provided with wrist pin bosses and with thrust ribs connecting said head and said bosses, and a control ring embodying parts extending circumferentially entirely along said thrust faces and anchored therein but only at the middles thereof and having parts extending along but entirely inside of said ribs and free thereof so as to be unaffected by expansion with the skirt along the wrist pin axis.

2. A piston of a light metal of a relatively high coefficient of thermal expansion, comprising, a head, a skirt depending from said head and provided with thrust faces one of which is separated from said head by a circumferential slot, provided with wrist pin bosses and with thrust ribs connecting said head and said bosses, and a control ring embodying parts extending circumferentially entirely along said thrust faces and anchored therein but only at the middles thereof and having inward bends extending along but entirely inside of said ribs and free thereof so as to be unaffected by expansion with the skirt along the wrist pin axis.

3. A piston of a light metal of a relatively high coefficient of thermal expansion, comprising, a head, a skirt depending from said head and provided with thrust faces, which are separated from said head by circumferential slots, provided with wrist pin bosses and with thrust ribs connecting said head and said bosses, and a control ring embodying parts extending circumferentially entirely along said thrust faces and anchored therein but only at the middles thereof and having parts extending along but entirely inside of said ribs and free thereof so as to be unaffected by expansion with the skirt along the wrist pin axis.

WILLIAM M. VENNER.
PERCY L. BOWSER, JR.

References Cited in the file of this patent

UNITED STATES PATENTS

| Number | Name | Date |
|---|---|---|
| 1,730,120 | Jardine | Oct. 1, 1929 |
| 1,881,237 | Nelson | Oct. 4, 1932 |
| 1,995,746 | Nelson | Mar. 26, 1935 |
| 2,044,087 | Long | June 16, 1936 |
| 2,110,346 | Teetor | Mar. 8, 1938 |
| 2,180,521 | Harley | Nov. 21, 1939 |
| 2,240,967 | Venner et al. | May 6, 1941 |
| 2,262,132 | Berry | Nov. 11, 1941 |
| 2,426,732 | Gates | Sept. 2, 1947 |
| 2,576,655 | Venner et al. | Nov. 27, 1951 |